Sept. 15, 1936.  J. LEITSHUH  2,054,480
TOOL FOR DERINDING FRUIT
Filed May 9, 1935
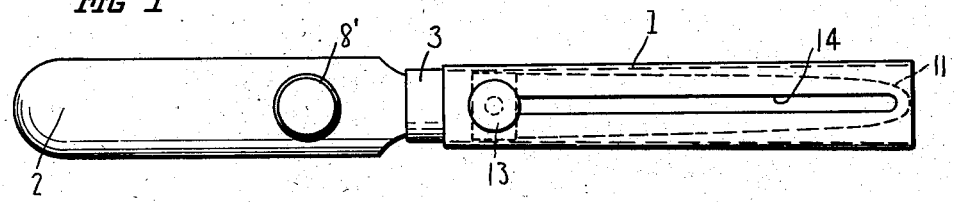
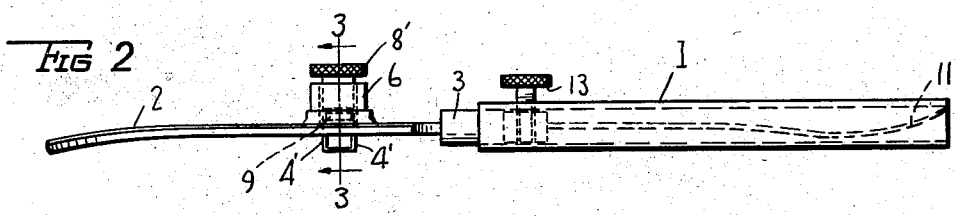
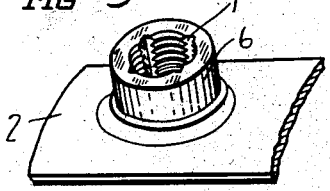
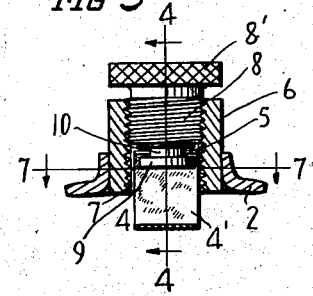
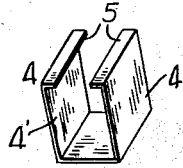
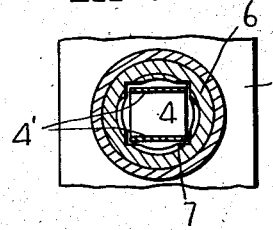
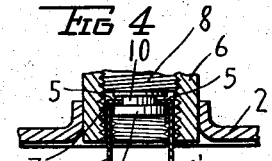
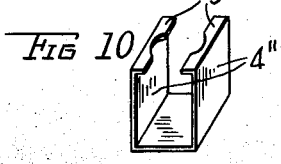
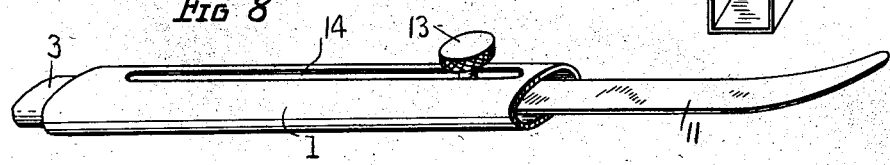
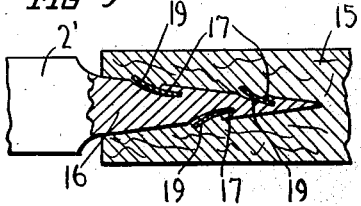
INVENTOR
Joseph Leitshuh
BY Staley & Welch
ATTORNEYS Patented Sept. 15, 1936

2,054,480

UNITED STATES PATENT OFFICE 2,054,480

TOOL FOR DERINDING FRUIT

Joseph Leitshuh, Springfield, Ohio

Application May 9, 1935, Serial No. 20,542

1 Claim. (Cl. 30—20)

This invention relates to a tool for derinding oranges, grape fruits, lemons, or the like, it more particularly relating to improved means for adjusting the cutter of the tool to readily adapt it to rinds of different thicknesses.

The object of the invention is to provide means for quickly and readily adjusting the cutter of a tool of the character referred to.

In the accompanying drawing:

Fig. 1 is a top plan view of a tool embodying the improvement.

Fig. 2 is a side elevation of the same.

Fig. 3 is an enlarged section on the line 3—3 of Fig. 2.

Fig. 4 is a fragmentary enlarged section on the line 4—4 of Fig. 3.

Fig. 5 is an enlarged perspective view of a portion of the tool.

Fig. 6 is an enlarged perspective view of the cutter.

Fig. 7 is a section on the line 7—7 of Fig. 3.

Fig. 8 is a fragmentary perspective view of a portion of the tool.

Fig. 9 is a detail in section of a modification.

Fig. 10 is a perspective view showing a modification in the form of the cutter.

Referring first to Figs. 1 to 7, inclusive, 1 represents a handle preferably in the form of a metallic housing, the details of which will be described later. Rigidly connected with the handle is a slightly curved metallic blade 2, the blade being rigidly connected to a shank 3' which in turn is rigidly connected with the handle. This blade carries an adjustable cutter 4 which is of U-shaped form as shown best in Fig. 6, and the free ends of the legs 4' of which have inturned flanges 5.

Fixed in a flanged aperture in the blade 2 is a boss 6 having a square opening 7 to receive the cutter 4. The opening in this boss 6 is also screw-threaded to receive an adjusting screw 8, the upper end of which is provided with a knurled finger piece 8' and the lower end of which is reduced and provided with an integral head 9 so as to form a groove 10. The cutter is of spring steel and by springing the legs 4' of the cutter apart the flanges 5 may be positioned in the groove 10 of the adjusting screw and be retained therein by the natural resiliency of the metal of the cutter.

In assembling the parts, after the cutter has been positioned on the screw, the cutter is inserted into the opening in the boss from the upper end thereof and the screw 8 engaged with the threads of the boss, the square shape of the opening in the boss holding the cutter from turning. By means of the screw the cutter may be adjusted to any desired position to adapt it to the thickness of the rind of the fruit, the peculiar form of the cutter causing it to make two side cuts and an under cut in the rind in a manner well known in the art.

In addition to the blade 2 there is also provided another blade 11 which is positioned in the handle 1, the handle forming a housing for this blade. Threaded in the blade 11 is a screw 13 which extends through a slot 14 in the handle. This screw not only forms a convenient means for sliding the blade 11 into and out of the housing but also for holding it in position, as the screw may be tightened down on the bottom of the housing for that purpose.

In Fig. 9 the blade 2' is shown attached to a wooden handle 15, the blade 2' having a tapered shank 16 which is split at a plurality of points as indicated at 17, a sharpened spring metal strip 19 being inserted in each split so that when the shank 16 has been inserted in the handle these sharpened strips 19 will spring out and hold the parts together.

In Fig. 10 a slight modification in the form of the cutter is shown in which the flanges 5' on the free ends of the legs 4'' are formed with rounded recesses so that these flanges will embrace more closely the groove 10 of the adjusting screw.

Having thus described my invention, I claim:

In a tool of the character described, a blade, a hollow boss carried by said blade, a portion at least of the opening in said boss being square and a portion at least screw-threaded, a U-shaped cutter and an adjusting screw mounted in the opening in said boss, said adjusting screw having a groove at its inner end, and projections on said cutter loosely fitted in said groove whereby the cutter may be adjusted with relation to said blade.

JOSEPH LEITSHUH.